United States Patent
Higashikata et al.

(10) Patent No.: US 10,194,056 B2
(45) Date of Patent: Jan. 29, 2019

(54) COLOR PROCESSING DEVICE, IMAGE FORMING APPARATUS, AND IMAGE FORMING SYSTEM

(71) Applicant: FUJI XEROX CO., LTD., Tokyo (JP)

(72) Inventors: Ryosuke Higashikata, Kanagawa (JP); Yoshitaka Kuwada, Kanagawa (JP); Jungo Harigai, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 21 days.

(21) Appl. No.: 15/667,676

(22) Filed: Aug. 3, 2017

(65) Prior Publication Data

US 2018/0183979 A1  Jun. 28, 2018

(30) Foreign Application Priority Data

Dec. 27, 2016  (JP) ................. 2016-252621

(51) Int. Cl.
*H04N 1/60* (2006.01)
*G06K 15/02* (2006.01)
*H04N 1/405* (2006.01)

(52) U.S. Cl.
CPC ......... *H04N 1/6008* (2013.01); *G06K 15/188* (2013.01); *G06K 15/1859* (2013.01); *H04N 1/6052* (2013.01); *G06K 15/184* (2013.01); *H04N 1/405* (2013.01); *H04N 2201/0091* (2013.01)

(58) Field of Classification Search
CPC .... H04N 1/6008; H04N 1/6052; H04N 1/405; H04N 2201/0091; G06K 15/1859; G06K 15/188; G06K 15/184
See application file for complete search history.

(56) References Cited

U.S. PATENT DOCUMENTS

| | | | |
|---|---|---|---|
| 8,045,186 B2 * | 10/2011 | Sakurai | G06T 5/009 358/1.12 |
| 8,681,379 B2 | 3/2014 | Nakamura | |
| 2015/0201110 A1 * | 7/2015 | Sakatani | H04N 1/6041 358/504 |

FOREIGN PATENT DOCUMENTS

| | | |
|---|---|---|
| JP | 2007-221182 A | 8/2007 |
| JP | 2009-089007 A | 4/2009 |
| JP | 2013-030996 A | 2/2013 |

* cited by examiner

*Primary Examiner* — Quang N Vo
(74) *Attorney, Agent, or Firm* — Sughrue Mion, PLLC

(57) ABSTRACT

A color processing device includes a color-data acquisition section, a conversion-relationship generation section, a correction-image-data generation section, and a conversion-relationship correction section. The color-data acquisition section acquires color data of a first image output by a first image forming device. In accordance with a first relationship and a second relationship, the conversion-relationship generation section generates a conversion relationship used for color adjustment performed to match a color of a second image to be output by a second image forming device on a basis of unadjusted image data with a color of the first image. The correction-image-data generation section generates, on a basis of the unadjusted image data, correction image data for correcting the conversion relationship. The conversion-relationship correction section performs correction of the conversion relationship on a basis of color data of correction images output by the second image forming device by using the correction image data.

8 Claims, 12 Drawing Sheets

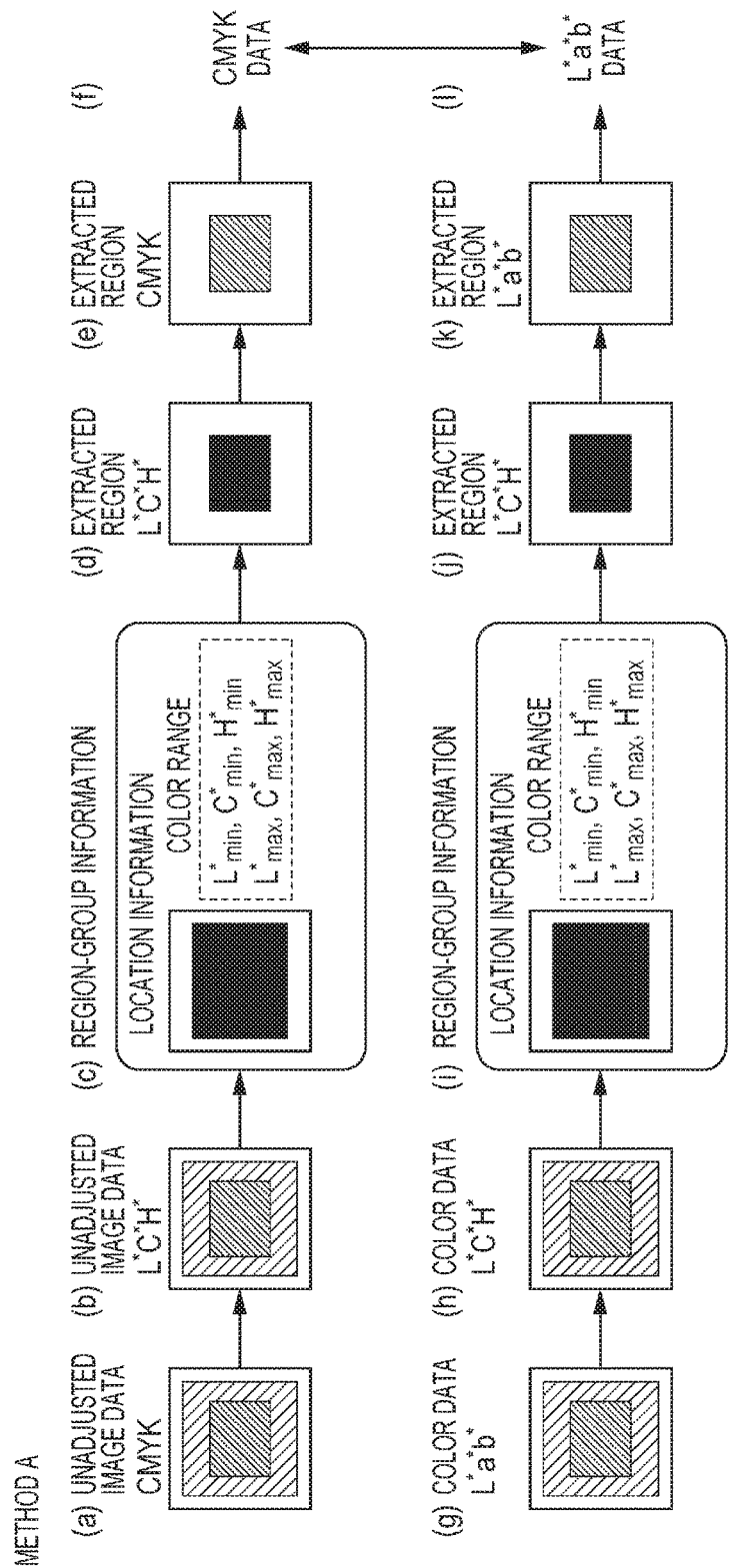

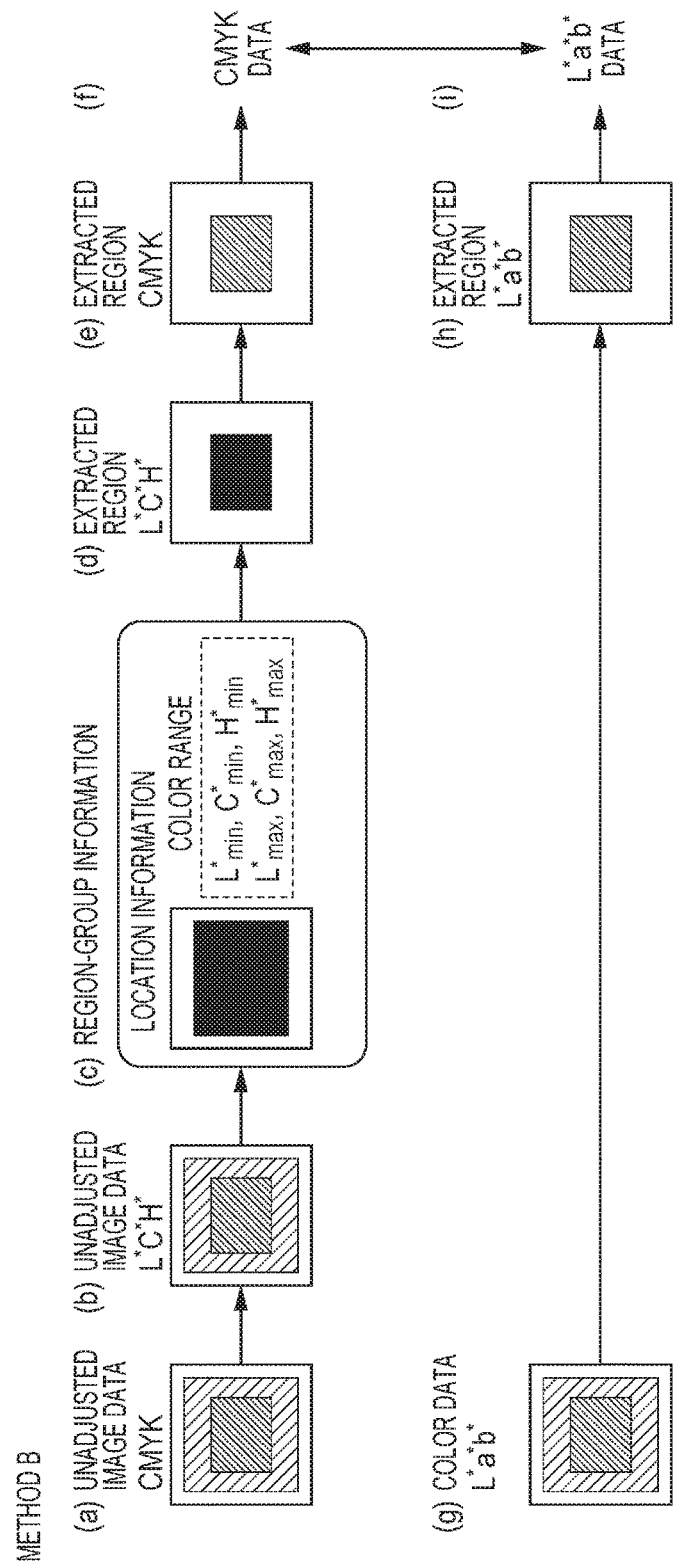

COLOR PROCESSING DEVICE, IMAGE FORMING APPARATUS, AND IMAGE FORMING SYSTEM

CROSS-REFERENCE TO RELATED APPLICATIONS

This application is based on and claims priority under 35 USC 119 from Japanese Patent Application No. 2016-252621 filed Dec. 27, 2016.

BACKGROUND

(i) Technical Field

The present invention relates to a color processing device, an image forming apparatus, and an image forming system.

(ii) Related Art

In recent years, offset printing machines have been gradually and increasingly replaced with on-demand digital printing machines in the printing market. An example of an on-demand printer usage is reprinting. In reprinting, in some cases, an on-demand printer is used for a small number of copies after an offset printing machine is used for a large number of copies, and in other cases, only an on-demand printer is used without using an offset printing machine.

To adjust the colors of printed materials output in such reprinting to match the colors of printed materials output in the past, there is a need to generate a color conversion profile through colorimetry performed on color patches printed in the past and to output the printed materials using the same print output setting (such as a color conversion profile setting) as those in the past.

SUMMARY

According to an aspect of the invention, there is provided a color processing device including a color-data acquisition section, a conversion-relationship generation section, a correction-image-data generation section, and a conversion-relationship correction section. The color-data acquisition section acquires color data of a first image output by a first image forming device on a basis of image data. The conversion-relationship generation section generates a conversion relationship used for performing color adjustment. The conversion relationship is generated in accordance with a first relationship that is a relationship between unadjusted image data to undergo the color adjustment and the color data of the first image and a second relationship regarding a second image forming device. The color adjustment is performed to match a color of a second image to be output by the second image forming device on a basis of the unadjusted image data with a color of the first image. The correction-image-data generation section generates, on a basis of the unadjusted image data, correction image data for correcting the conversion relationship. The conversion-relationship correction section performs correction of the conversion relationship on a basis of color data of correction images output by the second image forming device by using the correction image data.

BRIEF DESCRIPTION OF THE DRAWINGS

An exemplary embodiment of the present invention will be described in detail based on the following figures, wherein:

FIG. 7 is a diagram for explaining a first example of Step 1 in which a first-relationship generation section generates a first relationship;

FIG. 8 is a diagram for explaining a second example of Step 1 in which the first-relationship generation section generates the first relationship;

DETAILED DESCRIPTION

Overall Configuration of Image Forming System

An exemplary embodiment of the invention will be described in detail with reference to the drawings.

Figure 1:
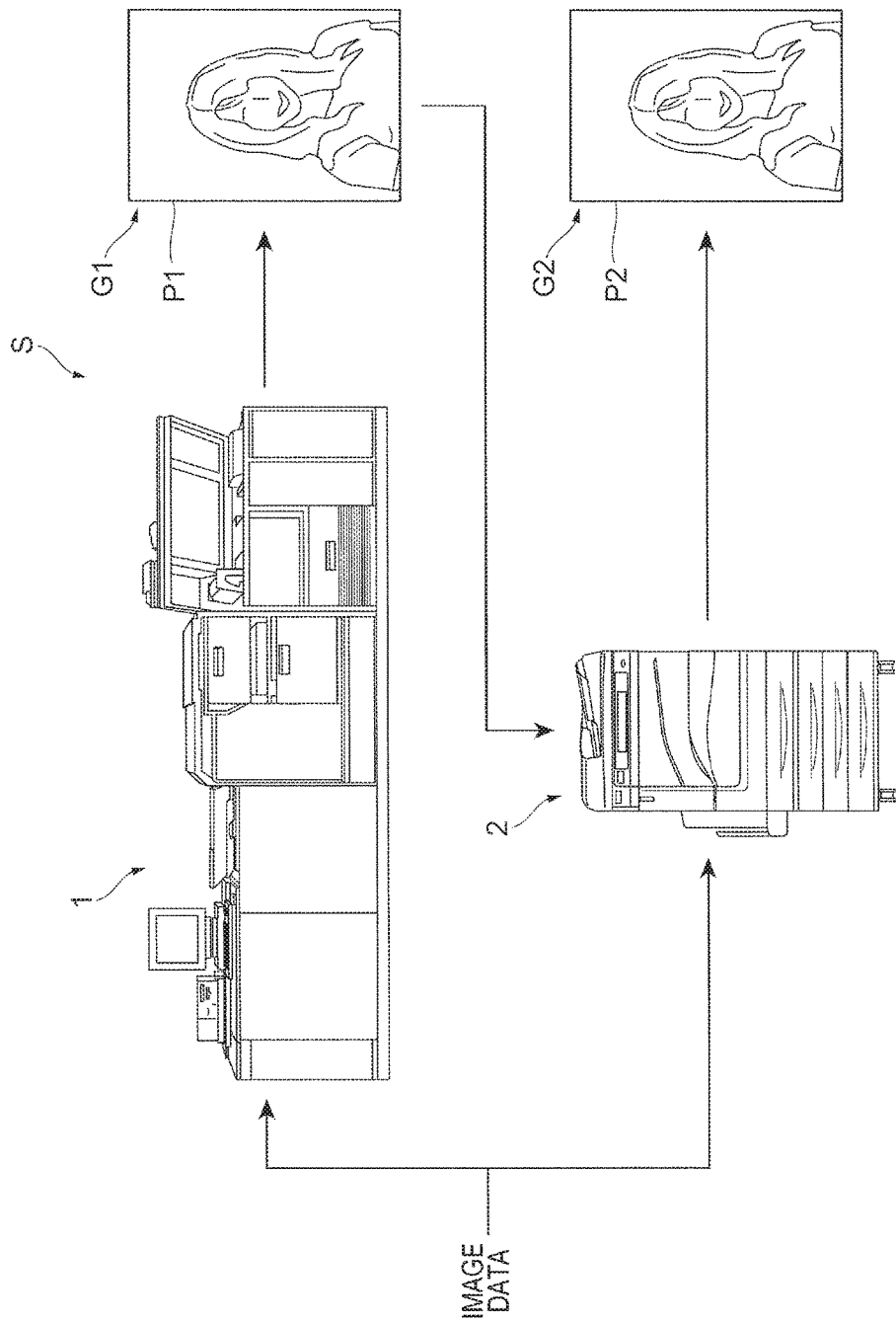
FIG. 1 is a diagram illustrating an example of an overall configuration of an image forming system according to the exemplary embodiment.

FIG. 1 is a diagram illustrating an example of an overall configuration of an image forming system according to the exemplary embodiment.

An image forming system S illustrated in FIG. 1 includes an image forming apparatus 1 and an image forming apparatus 2.

Each of the image forming apparatuses 1 and 2 is a printing mechanism that forms an image on a medium (recording medium) on the basis of image data and uses at least one type of a color material. The image data represents an image for, for example, a print job transmitted from a user. The image data may be data in a raster image format or data described in a page description language (PDL).

Each of the image forming apparatuses 1 and 2 uses, for example, an electrophotographic system in the exemplary embodiment. After the printing on a medium, each of the image forming apparatuses 1 and 2 outputs the medium as a printed material to the outside. FIG. 1 illustrates a case where the image forming apparatus 1 forms an image G1 (first image) on a sheet of paper (paper sheet) P1 and outputs the paper sheet P1 and where the image forming apparatus 2 forms an image G2 (second image) on a paper sheet P2 and outputs the paper sheet P2.

The image forming apparatus 2 includes at least an image reading device 100 that reads an image, and the image reading device 100 reads the image G1 formed on the paper sheet P1. This will be described in detail later.

Image Forming Apparatus Overview

An overview of the image forming apparatuses 1 and 2 will be described. The image forming apparatuses 1 and 2 basically have the same configuration, and the image forming apparatus 2 will hereinafter be described taken as an example.

Figure 2:
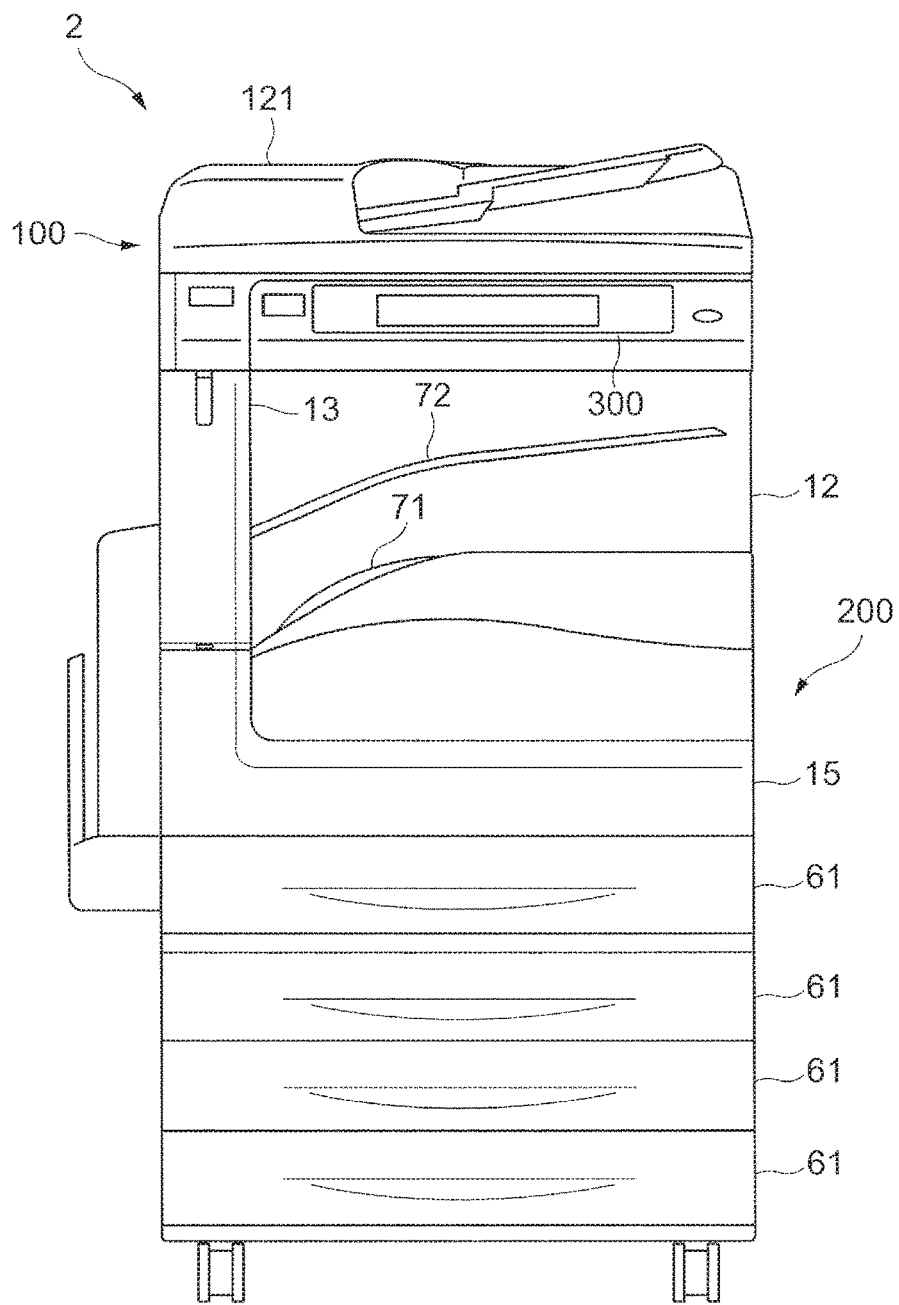
FIG. 2 is a diagram illustrating the appearance of an image forming apparatus according to the exemplary embodiment.
Figure 3:
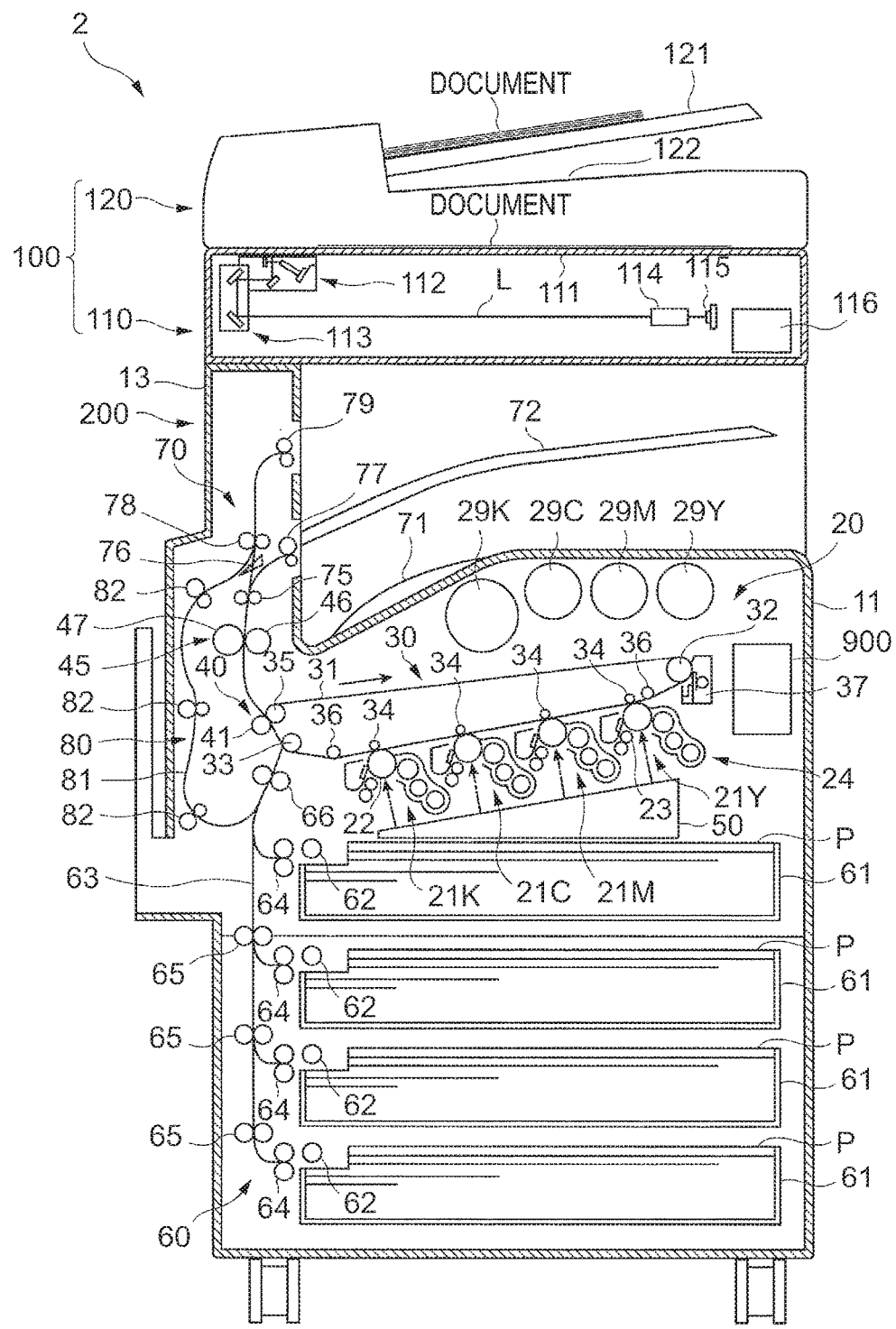
FIG. 3 is a diagram illustrating the internal structure of the image forming apparatus according to the exemplary embodiment.

FIG. 2 is a diagram illustrating the appearance of the image forming apparatus 2 according to the exemplary embodiment. FIG. 3 is a diagram illustrating the internal structure of the image forming apparatus 2 according to the exemplary embodiment.

The image forming apparatus 2 includes the image reading device 100 that reads the image of a document and an image recording device 200 that is an example of an image forming device that forms an image on a medium on the basis of image data. The image recording device 200 functions as a first image forming device in the image forming apparatus 1 and functions as a second image forming device in the image forming apparatus 2. The image forming apparatus 2 further includes a user interface (UI) 300 and a controller 900. The UI 300 receives user operation input and displays various pieces of information to the user. The controller 900 controls overall operations of the image forming apparatus 2.

The image reading device 100 is an example of an image reading device and is disposed in an upper portion of the image forming apparatus 2. The image recording device 200 is disposed under the image reading device 100 and has the controller 900 incorporated in the image recording device 200. The user interface 300 is disposed on the side closer to the user in the upper portion of the image forming apparatus 2, that is, the side, closer to the user, of an image reading section 110 (described later) of the image reading device 100.

The image reading device 100 will first be described.

The image reading device 100 includes the image reading section 110 that reads the image of a document and a document transport section 120 that transports the document to the image reading section 110. The document transport section 120 and the image reading section 110 are respectively disposed in an upper portion and a lower portion of the image reading device 100.

The document transport section 120 includes a document tray 121 that accommodates the document and a document discharge section 122 to which the document transported from the document tray 121 is discharged. The document transport section 120 transports the document from the document tray 121 to the document discharge section 122.

The image reading section 110 includes a platen glass 111, a light irradiating unit 112, a light guide unit 113, and an imaging lens 114. The light irradiating unit 112 radiates light L onto a read surface (image surface) of the document. The light guide unit 113 guides the light L reflected from the read surface of the document. The imaging lens 114 forms an optical image of the light L guided by the light guide unit 113. The image reading section 110 also includes a detector 115 and an image processing section 116. The detector 115 includes photoelectric conversion elements, such as a charge coupled device (CCD) image sensor, which photoelectrically convert the image of the light L formed through the imaging lens 114. The detector 115 detects the formed optical image. The image processing section 116 is electrically connected to the detector 115 and receives electric signals obtained by the detector 115.

The image reading section 110 reads not only the image of the document transported by the document transport section 120 but also the image of the document placed on the platen glass 111.

The image recording device 200 will be described.

The image recording device 200 includes an image forming section 20, a medium supply section 60, a medium discharge section 70, and a reversing section 80. The image forming section 20 forms an image on a medium. The medium supply section 60 supplies the image forming section 20 with a paper sheet P. The medium discharge section 70 discharges the paper sheet P on which the image forming section 20 forms the image. The reversing section 80 turns over the paper sheet P having a surface on which the image forming section 20 forms the image. The reversing section 80 transports the paper sheet P again to the image forming section 20.

The image forming section 20 includes four image forming units 21 (21Y, 21M, 21C, and 21K) for yellow (Y), magenta (M), cyan (C), and black (K) that are arranged parallel to and a predetermined distance away from each other. Each image forming unit 21 includes a photoconductor drum 22, a charger 23 that uniformly charges the surface of the photoconductor drum 22, and a developer 24 that develops and makes visible an electrostatic latent image formed by laser radiated by an optical system unit 50 (described later) by using predetermined color-component toner. The image forming section 20 also includes toner cartridges 29Y, 29M, 29C, and 29K for respectively supplying color toner to the developers 24 of the image forming units 21Y, 21M, 21C, and 21K.

The image forming section 20 includes the optical system unit 50 below the image forming units 21Y, 21M, 21C, and 21K, the optical system unit 50 radiating a laser beam onto the photoconductor drums 22 of the respective image forming units 21Y, 21M, 21C, and 21K. The optical system unit 50 includes semiconductor laser (not illustrated), a modulator (not illustrated), a polygon mirror (not illustrated) for deflective scanning of the laser beam emitted from the semiconductor laser, a glass window (not illustrated) through which the laser beam passes, and a frame (not illustrated) for hermetically enclosing the components.

In addition, the image forming section 20 includes an intermediate transfer unit 30, a second transfer unit 40, and a fixing device 45. The intermediate transfer unit 30 transfers color toner images respectively formed on the photoconductor drums 22 of the image forming units 21Y, 21M, 21C, and 21K onto an intermediate transfer belt 31 in such a manner as to superpose the color toner images on each other. The second transfer unit 40 transfers, onto a paper sheet P, a toner image formed on the intermediate transfer unit 30 through the superposition. The fixing device 45 heats and presses the toner image formed on the paper sheet P to thereby fix the toner image on the paper sheet P.

The intermediate transfer unit 30 includes the intermediate transfer belt 31, a drive roller 32 that drives the intermediate transfer belt 31, and a tension roller 33 that provides the intermediate transfer belt 31 with a predetermined tension. The intermediate transfer unit 30 also includes multiple (four in the exemplary embodiment) first transfer rollers 34 and a backup roller 35. Each first transfer roller 34 faces the corresponding photoconductor drum 22 across the intermediate transfer belt 31 and is provided to transfer the toner image formed on the photoconductor drum 22 onto the intermediate transfer belt 31. The backup roller 35 faces a second transfer roller 41 (described later) across the intermediate transfer belt 31.

The intermediate transfer belt 31 is stretched around multiple rotary members such as the drive roller 32, the tension roller 33, the first transfer rollers 34, the backup roller 35, and driven rollers 36. The intermediate transfer belt 31 is driven to be rotated at a predetermined speed in the arrow direction by the drive roller 32 rotated by a drive motor (not illustrated). The intermediate transfer belt 31 is made of, for example, rubber or resin.

The intermediate transfer unit 30 also includes a cleaning device 37 that removes remaining toner and the like on the intermediate transfer belt 31. The cleaning device 37 removes the remaining toner, paper powder, and the like from the surface of the intermediate transfer belt 31 having undergone the toner image transfer process.

The second transfer unit 40 includes the second transfer roller 41 that is disposed at the second transfer location and that performs second transfer of an image onto the paper sheet P by pressing the intermediate transfer belt 31 against the backup roller 35. The second transfer roller 41 and the backup roller 35 that faces the second transfer roller 41 across the intermediate transfer belt 31 define the second transfer location where the toner image transferred onto the intermediate transfer belt 31 is transferred onto the paper sheet P.

The fixing device 45 uses a heat fixing roller 46 and a pressure roller 47 to heat and press the image (toner image) having undergone the second transfer performed by the intermediate transfer unit 30. The fixing device 45 thereby fixes the image onto the paper sheet P.

The medium supply section 60 includes medium containers 61, a feed roller 62, a transport path 63, and transport rollers 64, 65, and 66. Each medium container 61 contains media on which images are to be recorded. The feed roller 62 is used to feed paper sheets P contained in the medium container 61. Each paper sheet P fed with the feed roller 62 is transported through the transport path 63. The transport rollers 64, 65, and 66 are arranged along the transport path 63 and are used to transfer the paper sheet P fed with the feed roller 62 to the second transfer location.

The medium discharge section 70 includes a first stacking tray 71 and a second stacking tray 72. The first stacking tray 71 is disposed above the image forming section 20, and media on which the image forming section 20 forms images are stacked on the first stacking tray 71. The second stacking tray 72 is disposed between the first stacking tray 71 and the image reading device 100, and media on which the image forming section 20 forms images are stacked on the second stacking tray 72.

The medium discharge section 70 includes a transport roller 75 and a switching gate 76. The transport roller 75 is disposed downstream of the fixing device 45 in a transport direction and used to transport the paper sheet P having the toner image fixed thereon. The switching gate 76 is disposed downstream of the transport roller 75 in the transport direction and performs switching between the first stacking tray 71 and the second stacking tray 72 that are targets for discharging the paper sheet P. The medium discharge section 70 also includes a first discharge roller 77 disposed downstream of the switching gate 76 and used for discharging the paper sheet P transported toward the first stacking tray 71 (rightwards in FIG. 3) having undergone the switching performed by the switching gate 76 as one of the targets of discharging the paper P. The medium discharge section 70 also includes a transport roller 78 and a second discharge roller 79. The transport roller 78 is disposed downstream of the switching gate 76 and used for transporting the paper sheet P toward the second stacking tray 72 (upwards in FIG. 3) having undergone the switching performed by the switching gate 76 as the other target of discharging the paper sheet P, and the second discharge roller 79 is used for discharging the paper sheet P transported with the transport roller 78 to the second stacking tray 72.

The reversing section 80 includes a reversing path 81 that is disposed at the side of the fixing device 45 and through which the paper sheet P is transported, the paper sheet P being turned over by rotating the transport roller 78 in a direction opposite from the direction of discharging the paper sheet P to the second stacking tray 72. The reversing path 81 is provided with multiple transport rollers 82 arranged along the reversing path 81. The paper sheet P transported with the transport rollers 82 is transported again to the second transfer location by using the transport rollers 82.

The image recording device 200 also includes a body frame 11 and a housing 12. The body frame 11 directly or indirectly supports the image forming section 20, the medium supply section 60, the medium discharge section 70, the reversing section 80, and the controller 900. The housing 12 is attached to the body frame 11 and forms an outer surface of the image forming apparatus 2.

The body frame 11 includes an image-reading-device supporting section 13 including the switching gate 76, the first discharge roller 77, the transport roller 78, the second discharge roller 79, and other components and extending vertically to support the image reading device 100 on one lateral end portion of the image forming apparatus 2. The image-reading-device supporting section 13 together with a part, of the body frame 11, farther from the user supports the image reading device 100.

The image recording device 200 also includes a front covering 15 that is part of the housing 12, that is disposed on a side, of the image forming section 20, closer to the user, and that is attached to the body frame 11 to be openable.

By opening the front covering 15, the user may replace any one of the intermediate transfer unit 30 and the toner cartridges 29Y, 29M, 29C, and 29K of the image forming section 20 with new one.

The user interface 300 is, for example, a touch panel. When the touch panel is used as the user interface 300, various pieces of information such as image forming setting for the image forming apparatus 2 are displayed on the touch panel. The user touches the touch panel to perform operations of inputting the image forming setting and the like.

Example of Functional Configuration of Controller

Figure 4:
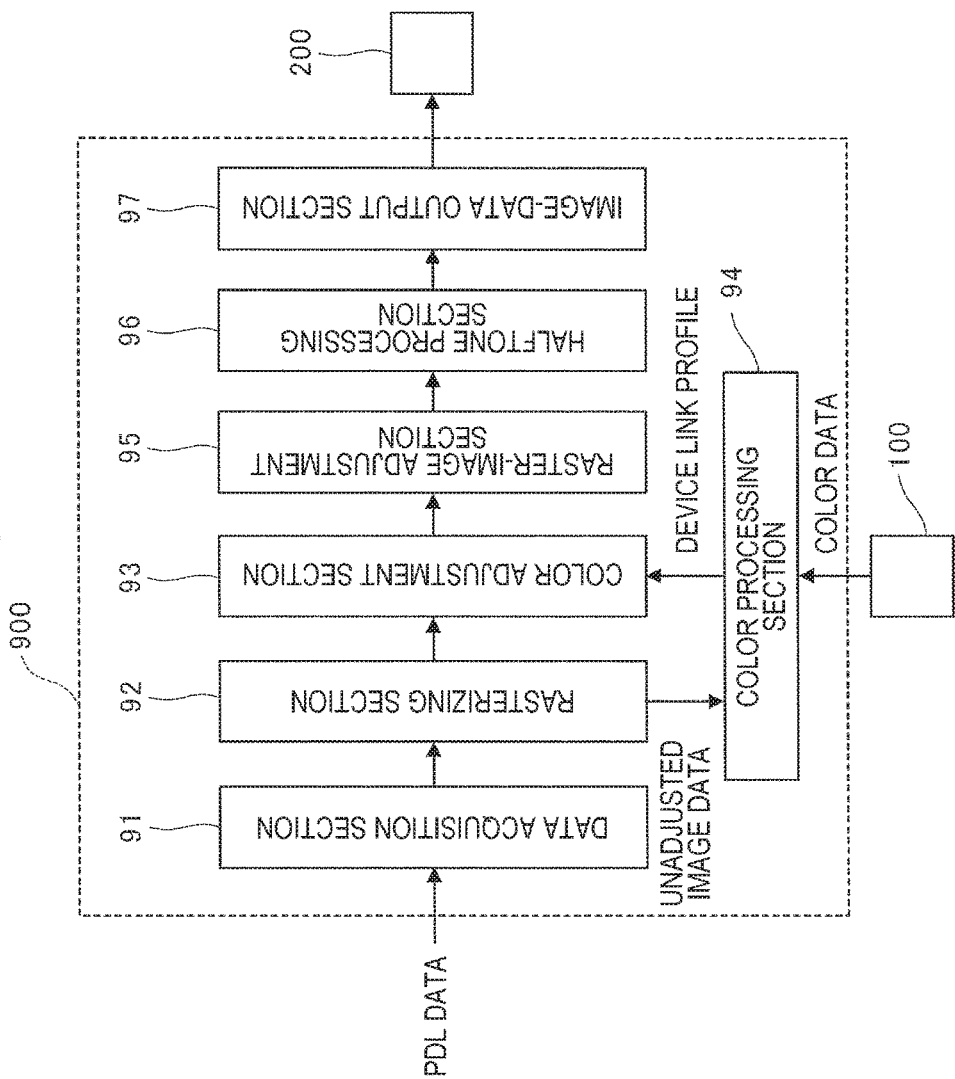
FIG. 4 is a block diagram illustrating a signal processing system in a controller.

FIG. 4 is a block diagram illustrating a signal processing system in the controller 900. Note that FIG. 4 illustrates functions related to signal processing that are selected from functions of the controller 900.

The controller 900 includes a data acquisition section 91, a rasterizing section 92, a color adjustment section 93, a color processing section 94, a raster-image adjustment section 95, a halftone processing section 96, and an image-data output section 97. The data acquisition section 91 acquires image data generated for outputting an image from the image recording device 200. The rasterizing section 92 generates a raster image from the acquired image data. The color adjustment section 93 performs color adjustment on CMYK data. The color processing section 94 generates a profile for the color adjustment to be performed by the color adjustment section 93. The raster-image adjustment section 95 adjusts the raster image converted by the color adjustment section 93. The halftone processing section 96 performs halftone processing. The image-data output section 97 outputs the image data having undergone color conversion processing to the image recording device 200.

In the exemplary embodiment, the data acquisition section 91 first receives PDL data serving as the image data.

The rasterizing section 92 converts the PDL data acquired by the data acquisition section 91 into raster data for each pixel. At this time, the rasterizing section 92 also converts the raster data including red, green, and blue (RGB) data into raster data including CMYK data. For example, after generating the raster data, the rasterizing section 92 converts the RGB data included in the raster data into XYZ color values that are device-independent, thereafter converts the XYZ color values into pieces of CMYK data that represent colors reproduced by the image recording device 200 (colors of toner as color materials that are cyan (C), magenta (M), yellow (Y), and black (K)), and outputs the pieces of CMYK data. The pieces of CMYK data are a piece of color C data, a piece of color M data, a piece of color Y data, and a piece of color K data that are separated on a per color basis.

The rasterizing section 92 outputs the raster image including the generated CMYK data to the color processing section 94. The data is data yet to be adjusted by the color adjustment section 93 and is to undergo color adjustment. In the exemplary embodiment, this is referred to as "unadjusted image data".

The color adjustment section 93 performs the color adjustment on the image to be formed by the image recording device 200. The color adjustment section 93 performs the color adjustment on the CMYK data so as to match the colors with desired colors to be output by the image recording device 200 in accordance with the CMYK data. Note that in the image forming apparatus 2, the color adjustment section 93 is also used so as to perform the color adjustment for outputting an image having colors adjusted to match those of a printed material output by the image forming apparatus 1. This will be described later.

The color adjustment is a process for converting, for example, CMYK data into $C_{in}M_{in}Y_{in}K_{in}$ data into $C_{out}M_{out}Y_{out}K_{out}$ data (pieces of data $C_{in}$, $M_{in}$, $Y_{in}$ and $K_{in}$ into pieces of data $C_{out}$, $M_{out}$, $Y_{out}$, and $K_{out}$). In the exemplary embodiment, the conversion is performed by using a so-called "device link profile" in which the $C_{in}M_{in}Y_{in}K_{in}$ data is directly converted into the $C_{out}M_{out}Y_{out}K_{out}$ data in the same CMYK color space as for the $C_{in}M_{in}Y_{in}K_{in}$ data. In the exemplary embodiment, the $C_{in}M_{in}Y_{in}K_{in}$ data is not converted into data in other color spaces such as an L*a*b* color space. The color adjustment section 93 stores the device link profile and applies the $C_{in}M_{in}Y_{in}K_{in}$ data to the device link profile to thereby perform the color adjustment.

In the exemplary embodiment, the color adjustment section 93 functions as a color adjustment device that performs color adjustment on an image to be formed by the image recording device 200 of the image forming apparatus 2. The device link profile is an example of a conversion relationship and may be generated as, for example, a four-dimensional look up table (LUT). In the exemplary embodiment, data having undergone the color adjustment performed by the color adjustment section 93 is referred to as "adjusted image data".

The color processing section 94 generates a device link profile used for the color adjustment performed by the color adjustment section 93. The color processing section 94 will be described in detail later. The color processing section 94 is an example of a color processing device. The color processing section 94 is also an example of a conversion-relationship generation device that generates a conversion relationship (device link profile) used for the color adjustment performed by the color adjustment section 93.

The raster image adjustment section 95 performs γ conversion, fineness processing, halftone processing, or the like on the $C_{out}M_{out}Y_{out}K_{out}$ data input from the color adjustment section 93 and performs various adjustments to obtain a better quality of an image output from the image recording device 200.

The halftone processing section 96 performs halftone processing on the adjusted image data by using dither mask processing that uses a dither mask having a predetermined threshold array in the main and sub scan directions. The adjusted image data is thereby expressed with, for example, binary values, not multiple values.

The image-data output section 97 outputs, to the image recording device 200, the adjusted image data having undergone the image processing such as the color conversion processing.

Color Processing Section

The color processing section 94 of the image forming apparatus 2 will be described in detail. A case where the color processing section 94 performs the color adjustment to output an image having colors adjusted to match the colors of a printed material output by the image forming apparatus 1 will be described.

The color processing section 94 generates a device link profile used for performing the color adjustment as described above.

Figure 5:
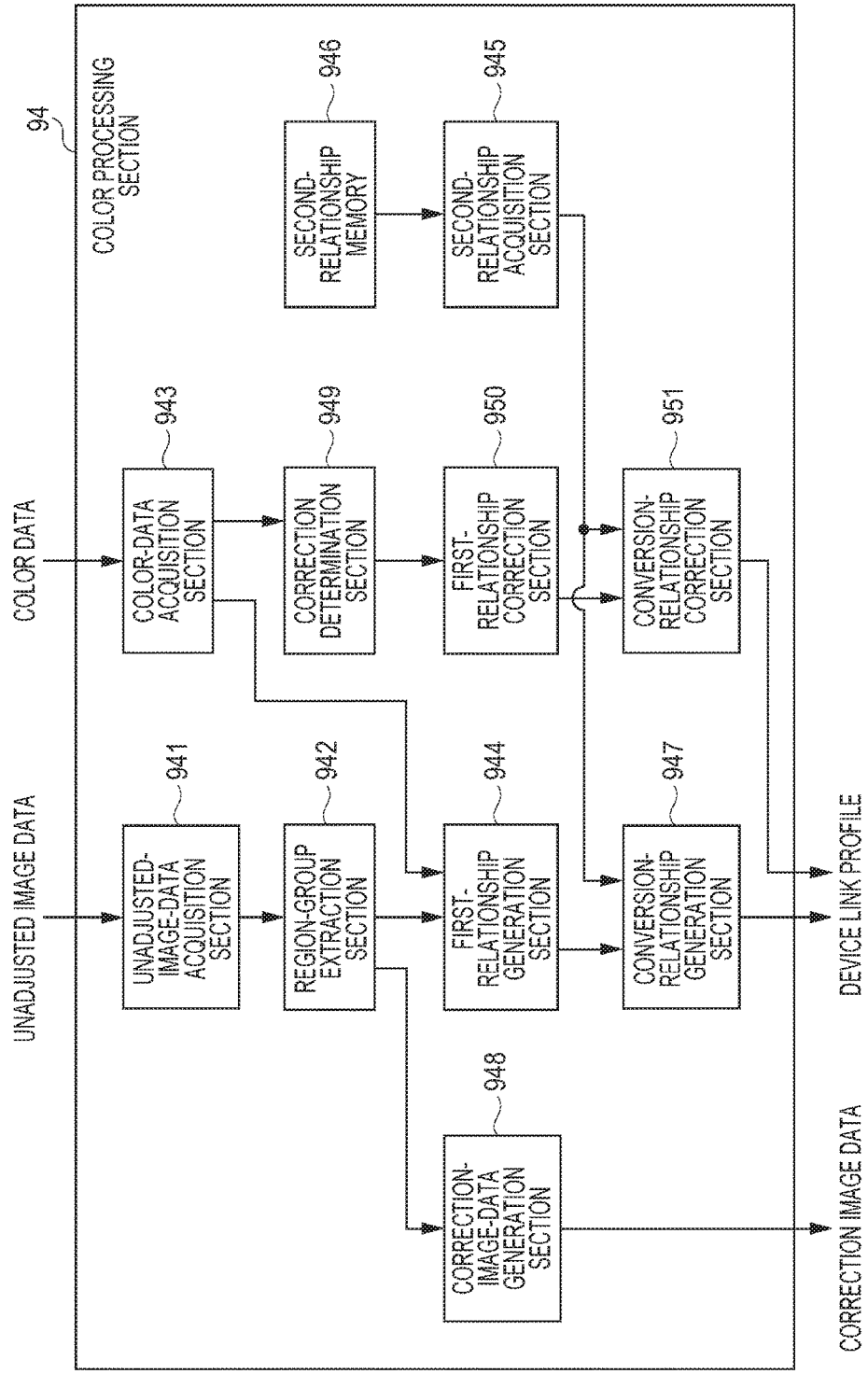
FIG. 5 is a block diagram for explaining the functional configuration of a color processing section.

FIG. 5 is a block diagram for explaining the functional configuration of the color processing section 94.

The color processing section 94 includes an unadjusted-image-data acquisition section 941, a region-group extraction section 942, a color-data acquisition section 943, a first-relationship generation section 944, a second-relationship acquisition section 945, a second-relationship memory 946, a conversion-relationship generation section 947, a correction-image-data generation section 948, a correction determination section 949, a first-relationship correction section 950, and a conversion-relationship correction section 951.

The unadjusted-image-data acquisition section 941 acquires unadjusted image data from the rasterizing section 92.

The region-group extraction section 942 extracts specific regions in an image as a region group on the basis of the unadjusted image data. The region group is composed of extracted regions that are set to determine a color difference between printed materials respectively output by the image forming apparatus 2 and the image forming apparatus 1. The color difference is acquired to adjust the colors of the printed material to be output by the image forming apparatus 2 to match those output by the image forming apparatus 1. The region-group extraction section 942 extracts the region group from the unadjusted image data that is the raster data acquired by the unadjusted-image-data acquisition section 941.

The region-group extraction section 942 also generates, as region-group information, information regarding the extracted region group. The region-group information includes information used for identifying the extracted regions forming the region group. For example, the region-group information includes location information or image information regarding the extracted regions. The region-group information will be described in detail later.

The color-data acquisition section 943 acquires color data (first color data) of an image G1 (first image) output by the image recording device 200 of the image forming apparatus 1. To acquire the color data, for example, the printed material having the image G1 is read by using the image reading device 100 of the image forming apparatus 2. Specifically, the image reading section 110 of the image reading device 100 reads the colors of the printed material and generates the color data. Examples of usable color data include L*a*b* values as device-independent data. The L*a*b* values are defined using the L*a*b* color space (also referred to as a CIELAB color space). In addition, the L*a*b* color space is expressed using a Cartesian coordinate color space having axes of the lightness L* and chromaticities a* and b* indicating hue.

Note that the CCD provided to the image reading section 110 generally reads an image on the basis of RGB data; however, after the reading, the image reading section 110 may convert the RGB data into L*a*b* data by using a multi-dimensional table corresponding to the reading characteristics of the CCD and may thereby output color data having the L*a*b* values. The multi-dimensional table may use, for example, International Color Consortium (ICC) profiles generated in accordance with the reading characteristics of the CCD.

The first-relationship generation section 944 generates a first relationship between the unadjusted image data and the color data (first color data) of the image G1 acquired by the color-data acquisition section 943.

The first relationship is a relationship (CMYK-$L^*_1 a^*_1 b^*_1$) between the CMYK data included in the unadjusted image data and the L*a*b* data that is the color data (first color data) (hereinafter, the first color data is also referred to as "$L^*_1 a^*_1 b^*_1$ data"). A method for generating a first relationship will be described in detail later.

The second-relationship acquisition section 945 acquires a second relationship regarding the image recording device 200 of the image forming apparatus 2, the second relationship corresponding to the first relationship for the image forming apparatus 2, the second relationship being between the unadjusted image data and the color data acquired from the image forming apparatus 2.

The second relationship is a relationship (CMYK-$L^*_2 a^*_2 b^*_2$) between the CMYK data and the L*a*b* data that is the color data (second color data) (hereinafter, the second color data is also referred to as "$L^*_2 a^*_2 b^*_2$ data"). The second relationship has been stored in the second-relationship memory 946, and the second-relationship acquisition section 945 acquires the second relationship from the second-relationship memory 946.

The second relationship is generated in advance and stored in the second-relationship memory 946. To generate a second relationship, a method in the related art may be used. For example, an image of color patches covering the full color gamut of the image recording device 200 of the image forming apparatus 2 is printed. The colors of the printed image are subsequently measured by using a colorimeter or another device, and color data is acquired. The color data thus acquired is the second color data ($L^*_2 a^*_2 b^*_2$ data). The unadjusted image data for printing the image of the color patches is correlated with the second color data, and the second relationship is thereby acquired.

The conversion-relationship generation section 947 generates, on the basis of the first and second relationships, a conversion relationship for performing color adjustment on an image G2 (second image) to be output from the image recording device 200 of the image forming apparatus 2 to match the colors of the image G2 with the colors of an image G1 (first image).

Specifically, the L*a*b* data ($L^*_1 a^*_1 b^*_1$ data) in the first relationship is compared with the L*a*b* data ($L^*_2 a^*_2 b^*_2$ data) in the second relationship. A relationship in the CMYK data between the first and second relationships is generated at the time when the $L^*_1 a^*_1 b^*_1$ data and the $L^*_2 a^*_2 b^*_2$ data match is generated. Specifically, the first relationship represents a relationship between the CMYK data that is the unadjusted image data and the colors of the image G1 printed by the image forming apparatus 1 when the CMYK data is input. Note that the term "to match" denotes "to match completely" or "to be similar to a predetermined degree". The second relationship represents a relationship between the CMYK data and the colors of the image G2 printed by the image forming apparatus 2 when the CMYK data is input. Even if the same CMYK data is input, the image G1 and the image G2 do not have the same colors because the apparatuses have different characteristics. In contrast, the conversion relationship represents the relationship of the CMYK data of the same colors between the images respectively printed by the image forming apparatuses 1 and 2. Hence, the CMYK data that is the unadjusted image data is converted by using the conversion relationship, and the image forming apparatus 2 prints an image by using the converted CMYK data. The image forming apparatus 2 naturally prints the image G2 having the same colors as those of the image G1 printed by the image forming apparatus 1. The use of the conversion relationship enables the color adjustment through which the image forming apparatus 2 prints a printed material in such a manner that the colors of the printed material are adjusted to match the colors of the printed material output from the image forming apparatus 1. The conversion relationship is included in the four-dimensional LUT and is the device link profile, as described above. The device link profile is transmitted to the color adjustment section 93, and the color adjustment section 93 uses the device link profile to perform the color adjustment of the image formed by the image recording device 200.

However, the color adjustment using the conversion relationship generated by the above-mentioned method does not have high accuracy in some cases. In the exemplary embodiment, the correction-image-data generation section 948, the correction determination section 949, the first-relationship correction section 950, and the conversion-relationship correction section 951 are provided to enhance the conversion relationship accuracy.

The correction-image-data generation section 948 generates, on the basis of unadjusted image data, correction image data for correcting the conversion relationship. The correction image data is data of an image used for correction (correction image). The correction image is a so-called color patch. This will be described in detail later. The image forming apparatus 2 prints the correction image on the basis of the correction image data. The printed correction image has undergone the color adjustment performed by the conversion-relationship generation section 947 in accordance with the conversion relationship described above. The color patch is measured with a colorimeter or another device, and the color data of the correction image may thereby be acquired. Instead of measuring the color patch with the colorimeter or another device, the method described with reference to the color-data acquisition section 943 may be used to acquire the color data.

In the exemplary embodiment, a user who uses a personal computer (PC) does not correct the conversion relationship by using data of an image intended to be printed by using the image forming apparatus 2. Instead, correction images in which multiple color patches are respectively arranged are generated. The color patches have a highly uniform color as the representative color of regions forming a region group extracted by the region-group extraction section 942. This enables the color data to be acquired and consequently enables the conversion relationship to be corrected with higher accuracy.

The color data of each correction image is acquired by the color-data acquisition section 943 and then transmitted to the correction determination section 949.

The correction determination section 949 obtains a color difference between the color data (first color data) of the image G1 (first image) and the corresponding color data of the correction image. The correction determination section 949 determines, on the basis of the color difference, whether the conversion relationship generated by the conversion-relationship generation section 947 needs to be corrected. Specifically, a predetermined threshold is provided for the determination by the correction determination section 949. If the color difference is equal to or smaller than the threshold, the correction determination section 949 determines that the conversion relationship does not need to be corrected. In contrast, if the color difference is larger than the threshold, the correction determination section 949 determines that the conversion relationship needs to be corrected. In other words, if the conversion relationship generated by the conversion-relationship generation section 947 enables the color adjustment to be performed accurately, the color difference is equal to or smaller than the threshold, and thus the conversion relationship does not need to be corrected. In contrast, if the conversion relationship generated by the conversion-relationship generation section 947 does not enable the color adjustment to be performed accurately, the color difference is larger than the threshold, and thus the conversion relationship needs to be corrected.

When the conversion relationship needs to be corrected, the first-relationship correction section 950 corrects the first relationship. Specifically, the first-relationship correction section 950 superposes the color difference on the first relationship generated by the first-relationship generation section 944 and generates a corrected first relationship having the color difference reflected thereon.

The conversion-relationship correction section 951 corrects the conversion relationship in accordance with the first relationship corrected by the first-relationship correction section 950. Specifically, the conversion-relationship correction section 951 regenerates a conversion relationship in accordance with the corrected first relationship generated by the first-relationship correction section 950 and the second relationship by the same method as that used by the conversion-relationship generation section 947.

In this case, it may also be said that the conversion-relationship correction section 951 corrects the conversion relationship on the basis of the color data of the correction image output by the image recording device 200 of the image forming apparatus 2 by using the correction image data.

A corrected device link profile that is the corrected conversion relationship is transmitted to the color adjustment section 93 in the same manner as the above-described device link profile. The color adjustment section 93 then uses the corrected device link profile to perform the color adjustment on the image to be formed by the image recording device 200.

It is preferable to repeat the correction of the conversion relationship until the color difference between the color data (first color data) of the image G1 (first image) and the corresponding color data of the correction image satisfies a predetermined condition. That is, feedback is performed to enhance the accuracy of the conversion relationship. Specifically, the correction is repeated until the correction determination section 949 determines that the conversion relationship does not need to be corrected because the color difference is equal to or smaller than the threshold. In addition, the correction determination section 949 may be configured not to perform further correction if an effect of color difference reduction is no longer obtained even though the color difference is larger than the threshold. Alternatively, the correction determination section 949 may be configured not to perform further correction if the conversion relationship is performed a predetermined number of times even though the color difference is larger than the threshold.

In the case where the correction of the conversion relationship is repeated, the image forming apparatus 2 prints a correction image in accordance with the previously corrected conversion relationship, and the color data of the correction image is acquired again. Since the correction image does not change, the correction image data first generated by the correction-image-data generation section 948 may be used without any additional processing. The correction determination section 949 then determines whether the corrected conversion relationship needs to be corrected. If the corrected conversion relationship needs to be corrected, the first-relationship correction section 950 again corrects the first relationship, and the conversion-relationship correction section 951 again corrects the conversion relationship. Thereafter, this is repeated until the correction determination section 949 determines that the conversion relationship does not need to be corrected.

Region-Group Information

The region-group information generated by the region-group extraction section 942 will be described.

The extracted regions forming the region group are regions having colors which are substantially uniform (hereinafter, referred to as uniform regions). Regions having substantially the same color signal in such uniform-color regions are selected as the extracted regions. As long as the uniform-color regions have substantially the same color signal, none of the uniform-color regions do not have to be the same size.

Figure 6C:
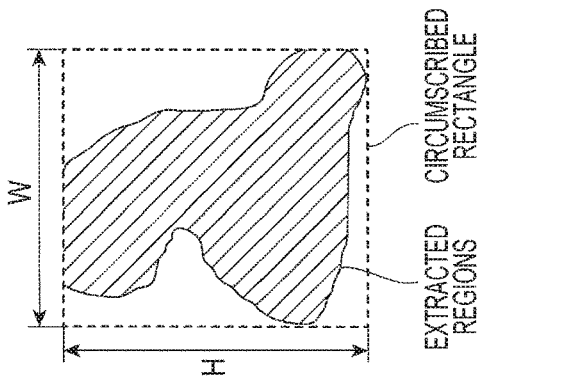
FIGS. 6A, 6B, and 6C are diagrams and histograms illustrating a method for generating a region group.
Figure 6B:
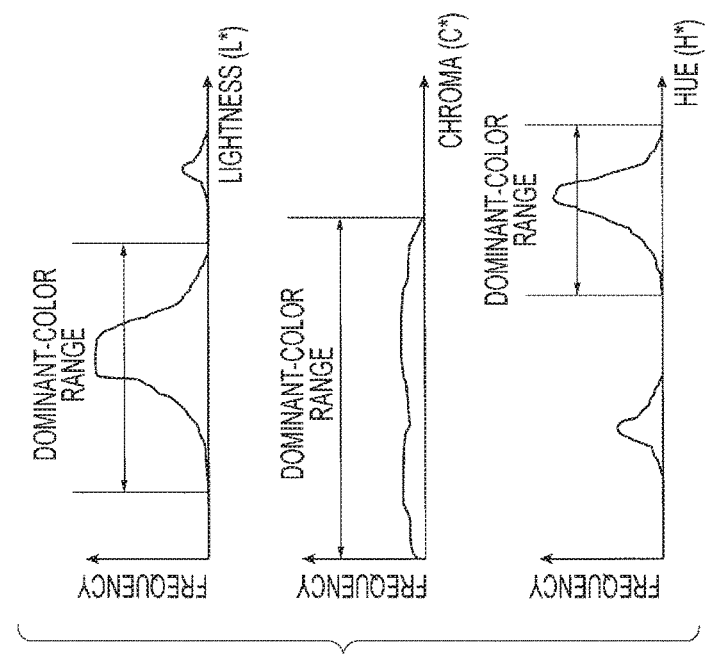
Figure 6A:
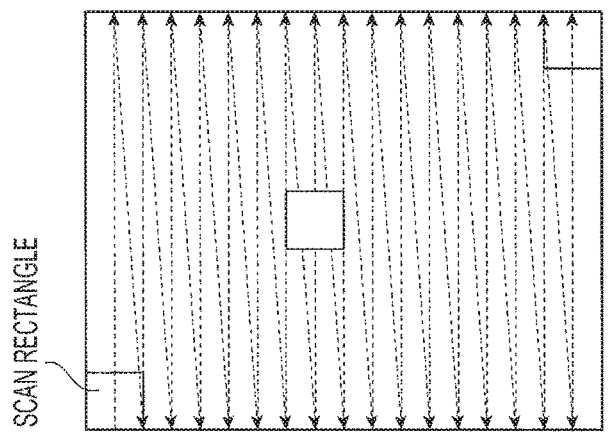

FIGS. 6A, 6B, and 6C are diagrams and histograms illustrating a method for generating a region group.

The region-group extraction section 942 sets scan rectangles of a predetermined size as illustrated in FIG. 6A and scans the raster image on the basis of the scan rectangles. The region-group extraction section 942 generates histograms of pixel values in each scan rectangle.

FIG. 6B illustrates examples of the histograms of a scan rectangle.

FIG. 6B illustrates a case where CMYK values in a raster image are converted into color values in an L*C*H* color space in which colors are represented using lightness, chroma, and hue and where histograms for lightness (L*), chroma (C*), and hue (H*) are generated. The horizontal axes respectively represent lightness (L*), chroma (C*), and hue (H*), and the vertical axes each represent the number of pixels as frequency.

A range having the highest frequency peak in the histogram is determined as a dominant-color range. FIG. 6B illustrates the ranges each having the highest frequency peak as the dominant-color ranges. A region included in the dominant-color range in the scan rectangle is referred to as a dominant-color region. If a percentage of the area (the number of pixels) of the dominant-color region relative to the area (the number of pixels) of the scan rectangle is equal to or higher than a predetermined threshold, and if color distribution of the pixels in the dominant-color region is equal to or lower than a predetermined threshold, the scan rectangle is selected as an extracted region. The dominant-color region of an adjacent scan rectangle is also checked. If the colors in the dominant-color regions are identical, the scan rectangles are coupled to each other. The processing is repeated for the scan rectangles arranged in succession, and such scan rectangles are grouped as a larger unit than a single scan rectangle. The dominant-color regions thus grouped are set as extracted regions. The extracted regions have an amorphous outline as illustrated, for example, in FIG. 6C.

A predetermined threshold for the height of a peak in FIG. 6B may be provided. If the height of a peak is lower than the threshold, it is desirable not to determine a range including the peak as the dominant-color range and not select the scan rectangle including the region as the extracted region.

The region-group extraction section 942 generates the region-group information. The region-group information includes the location information regarding the extracted regions. The location information includes, for example, an X upper-left-corner-of-circumscribed-rectangle coordinate, a Y upper-left-corner-of-circumscribed-rectangle coordinate, a circumscribed-rectangle width, a circumscribed-rectangle height, and bitmap information.

The X and Y upper-left-corner-of-circumscribed-rectangle coordinates are respectively the X and Y coordinates of the upper left corner of the rectangle indicated by a dotted line including the extracted regions as illustrated in FIG. 6C. The circumscribed-rectangle width is a width W of the circumscribed rectangle, and the circumscribed-rectangle height is a height H of the circumscribed rectangle H. According to the information, the location of the circumscribed rectangle is identifiable.

The bitmap information is binary image information having values of 1 indicating pixels belonging to the extracted regions in the circumscribed rectangle and 0 indicating the other pixels. In this case, areas indicated by 1 in the binary image are the extracted regions, and areas indicated by 0 are the other regions. The location of each extracted region in the circumscribed rectangle is thus identifiable.

The region-group information also includes information regarding the minimum values ($L^*_{min}$, $C^*_{min}$, and $H^*_{min}$) and the maximum values ($L^*_{max}$, $C^*_{max}$ and $H^*_{max}$) of the lightness ($L^*$), the chroma ($C^*$), and the hue ($H^*$) of the dominant-color region. The range of the colors in the extracted region is thereby identifiable.

Method for Generating First Relationship

How the first-relationship generation section 944 generates the first relationship will be described. The first relationship is herein generated in two steps of Step 1 and Step 2.

FIG. 7 is a diagram for explaining a first example of Step 1 in which the first-relationship generation section 944 generates a first relationship. FIG. 7 illustrates the first example as a method A.

First, Part (a) of FIG. 7 illustrates CMYK data that is unadjusted image data. The CMYK data is converted into $L^*C^*H^*$ data illustrated in Part (b) of FIG. 7. The region-group information illustrated in Part (c) of FIG. 7 is subsequently referred to, and the $L^*C^*H^*$ data regarding pixels in each extracted region is extracted as illustrated in Part (d) of FIG. 7. This is performed in such a manner that the location of each extracted region is first identified according to the location information included in the region-group information and that the extracted region is further identified on the basis of the minimum values ($L^*_{min}$, $C^*_{min}$, and $H^*_{min}$) and the maximum values ($L^*_{max}$, $C^*_{max}$, and $H^*_{max}$) of the $L^*$, $C^*$, and $H^*$ values in the extracted region. This enables identification of the location of the extracted region even if there is a discrepancy in region location between the unadjusted image data and the color data (first color data).

The $L^*C^*H^*$ data of each pixel in the extracted region is subsequently restored to the CMYK data as illustrated in Part (e) of FIG. 7. Further, the pieces of CMYK data of the respective pixels in the extracted region are averaged, and the average is used as the CMYK data of each extracted region illustrated in Part (f) of FIG. 7.

In contrast, Part (g) of FIG. 7 illustrates the $L^*_1 a^*_1 b^*_1$ data that is color data (first color data). The processing in Parts (h) to (j) of FIG. 7 is performed in the same manner as in Parts (b) to (d) of FIG. 7. The $L^*C^*H^*$ data of each pixel in the extracted region is subsequently restored to the $L^*_1 a^*_1 b^*_1$ data as illustrated in Part (k) of FIG. 7. Further, the pieces of $L^*_1 a^*_1 b^*_1$ data of the respective pixels in the extracted region are averaged, and the average is used as the $L^*_1 a^*_1 b^*_1$ data of each extracted region illustrated in Part (1) of FIG. 7.

Subsequently, the CMYK data of each extracted region illustrated in Part (f) of FIG. 7 and the $L^*_1 a^*_1 b^*_1$ data of each region in the region group illustrated in Part (1) of FIG. 7 are correlated with each other.

FIG. 8 is a diagram for explaining a second example of Step 1 in which the first-relationship generation section 944 generates the first relationship. FIG. 8 illustrates the second example as a method B.

The processing in Parts (a) to (f) of FIG. 8 is performed in the same manner as in Parts (a) to (f) of FIG. 7.

Part (g) of FIG. 8 is identical to Part (g) of FIG. 7 and illustrates the $L^*_1 a^*_1 b^*_1$ data that is color data (first color data). In this method, however, as illustrated in Part (h) of FIG. 8, the $L^*_1 a^*_1 b^*_1$ data is extracted in the same region as in Part (e) of FIG. 8. Subsequently, the pieces of $L^*_1 a^*_1 b^*_1$ data of the respective pixels in each extracted region are averaged, and the average is used as the $L^*_1 a^*_1 b^*_1$ data of the extracted region illustrated in Part (i) of FIG. 8.

Figure 9:
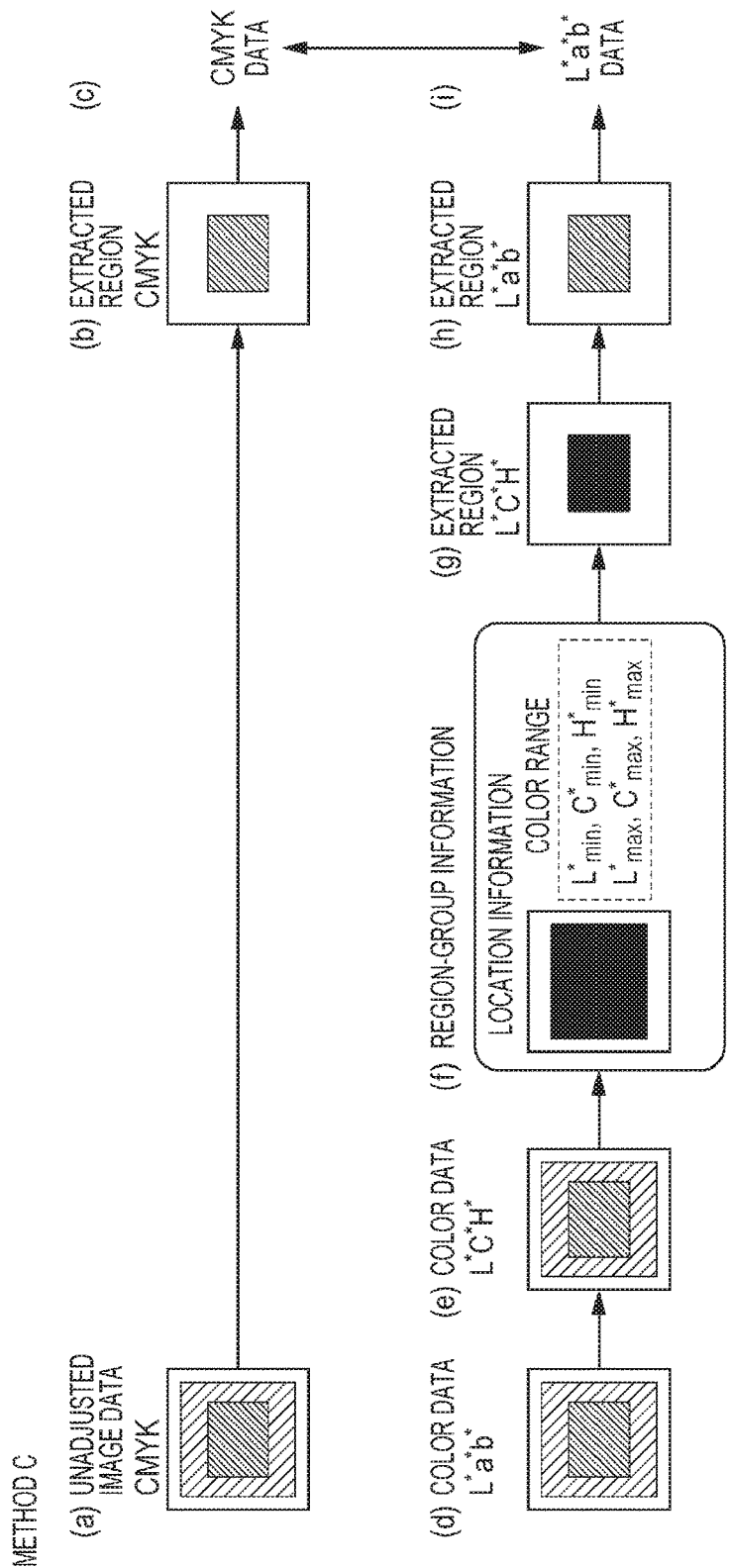
FIG. 9 is a diagram for explaining a third example of Step 1 in which the first-relationship generation section generates the first relationship.

FIG. 9 is a diagram for explaining a third example of Step 1 in which the first-relationship generation section 944 generates the first relationship. FIG. 9 illustrates the third example as a method C.

The processing in Parts (d) to (i) of FIG. 9 is performed in the same manner as in Parts (g) to (1) of FIG. 7.

Part (a) of FIG. 9 is identical to Part (a) of FIG. 7 and illustrates the CMYK data that is unadjusted image data. In this method, however, as illustrated in Part (b) of FIG. 9, the CMYK data is extracted in the same region as in Part (h) of FIG. 9. Subsequently, the pieces of the CMYK data of the respective pixels in each extracted region are averaged, and the average is used as the CMYK data of the extracted region illustrated in Part (c) of FIG. 9.

In the method A described with reference to FIG. 7, the $L^*C^*H^*$ data in Part (b) of FIG. 7 does not exactly match the $L^*C^*H^*$ data in Part (h) of FIG. 7 even though the $L^*C^*H^*$ data in Part (b) of FIG. 7 and the $L^*C^*H^*$ data in Part (h) of FIG. 7 are acquired on the basis of the same location, and the method A thus results in a slight discrepancy therebetween. Each extracted region is extracted as described above by using the minimum values ($L^*_{min}$, $C^*_{min}$, and $H^*_{min}$) and the maximum values ($L^*_{max}$, $C^*_{max}$, and $H^*_{max}$) of the $L^*$, $C^*$, and $H^*$ values. Accordingly, the extracted region in Parts (d) and (e) of FIG. 7 does not exactly match the extracted region in Parts (j) and (k) of FIG. 7 due to the discrepancy in the L*C*H* data, and this causes a location discrepancy between the extracted regions. As long as the discrepancy in L*C*H* data is not large, the location discrepancy between the extracted regions stays within a small range; however, a large discrepancy in the L*C*H* data causes a large location discrepancy between the extracted regions, so that the accuracy of the first relationship might be deteriorated.

In the method B described with reference to FIG. 8, the extracted region in Part (e) of FIG. 8 exactly matches the extracted region in Part (h) of FIG. 8. Accordingly, in a case where there is a large discrepancy in the L*C*H* data, the method B is likely to have higher accuracy of the first relationship than the method A. The same holds true for the method C.

Nevertheless, colors in unadjusted image data do not generally cover the full color gamut of the image forming apparatus 1. Accordingly, Step 1 generally results in a small number of first relationships (CMYK-$L^*_1 a^*_1 b^*_1$), and a sufficiently large number of first relationships to generate a high accuracy conversion relationship are not acquired in many cases. Hence, processing for covering the shortage is performed in Step 2.

FIGS. 10A, 10B, 10C, and 10D are diagrams for explaining Step 2 in the generation of first relationships performed by the first-relationship generation section 944.

The first-relationship generation section 944 applies the unadjusted image data and the acquired color data (first color data) of the image G1 to first relationship candidates prepared in advance in a wider color gamut than the color gamut of pieces of color data (first color data) and subsequently performs matching on the unadjusted image data and the acquired color data with a corresponding one of the first relationship candidates.

Figure 10A:
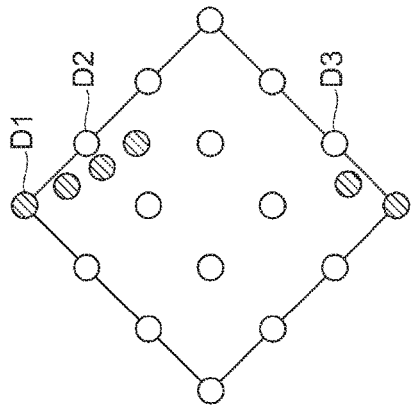
FIGS. 10A, 10B, 10C, and 10D are diagrams for explaining Step 2 in which the first-relationship generation section generates the first relationship.

FIG. 10A is a conceptual diagram illustrating the first relationship candidates prepared in advance.

FIG. 10A illustrates the first relationship (CMYK-$L^*_1 a^*_1 b^*_1$) candidates prepared in advance in the full color gamut (a rhombic area) of the image forming apparatus 1.

Figure 10B:
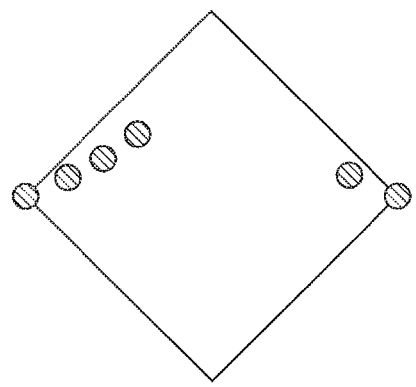

FIG. 10B illustrates the first relationships (CMYK-$L^*_1 a^*_1 b^*_1$) acquired in Step 1. In this case, the first relationships respectively have six pieces of data.

Figure 10C:
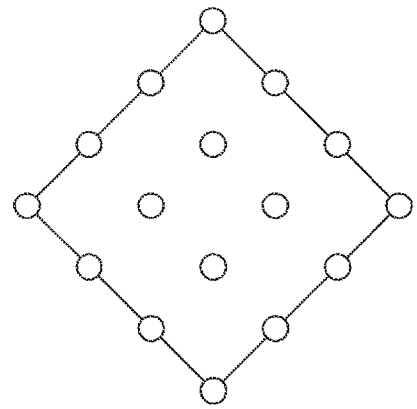

In the exemplary embodiment, the pieces of unadjusted image data and acquired color data (first color data) in FIG. 10B are applied to the first relationship candidates in FIG. 10A and are then merged, as illustrated in FIG. 10C.

The pieces of data in FIG. 10A, however, do not match the pieces of data in FIG. 10B, and not only application but also matching is thus performed. For example, one or more pieces of data in FIG. 10A in a Euclidean distance shorter than a predetermined Euclidean distance from a corresponding one of the pieces of data in FIG. 10B are removed. Alternatively, a weighting is set on the basis of a Euclidean distance from each piece of data in FIG. 10B to the corresponding piece of data in FIG. 10A, and the pieces of data in FIG. 10B are weighted.

Figure 10D:
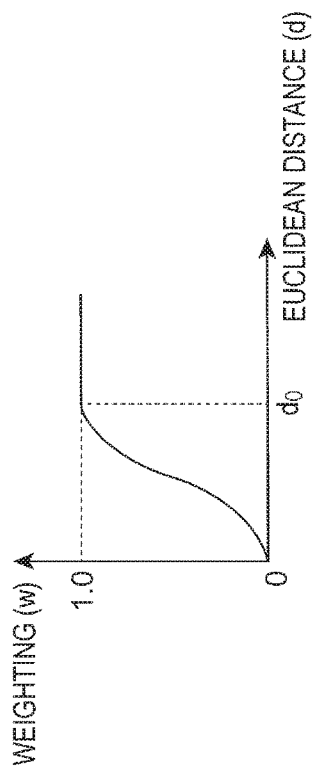

FIG. 10D is a graph illustrating a weighting w set as a Euclidean distance d.

In FIG. 10D, the horizontal axis represents the Euclidean distance d, the vertical axis represents the weighting w, and a relation $w=1/(1+d)$ is set.

In this case, the weighting w thus set is decreased as the Euclidean distance d from the corresponding piece of distance in FIG. 10B is decreased. For example, in a case where the Euclidean distance d is 0, the weighting w is 0. This case is equivalent to a case where the corresponding piece of data in FIG. 10A does not exist. The weighting w thus set is increased as the Euclidean distance d from the corresponding piece of distance in FIG. 10B is increased. If the Euclidean distance d is longer than a predetermined Euclidean distance $d_0$, the weighting w is 1. The case where the weighting w is 1 is equivalent to a case where the corresponding piece of data is weighted with no weighting w.

FIG. 10C illustrates locations D1, D2, and D3 of the pieces of data in FIG. 10A that are to be removed or weighted.

In this manner, the first-relationship generation section 944 covers the shortage of the first relationships in Step 1 and generates first relationships (CMYK-$L^*_1 a^*_1 b^*_1$) that cover the full color gamut of the image forming apparatus 1. That is, in Step 1, on the basis of the color data (first color data) of the image G1 acquired from the region group, the first-relationship generation section 944 generates a first relationship that partially covers the color gamut of the image forming apparatus 1 as a relationship between the unadjusted image data and the color data (first color data). In Step 2, the first-relationship generation section 944 generates a first relationship that covers the full color gamut of the image forming apparatus 1 by applying the first relationship that partially covers the color gamut of the image forming apparatus 1 to the first relationship candidates prepared in advance and by performing the matching. Note that "performing matching" herein includes merging pieces of data and performing adjustment using the weightings of the pieces of data as described above.

Note that colors in the unadjusted image data in the first relationships (CMYK-$L^*_1 a^*_1 b^*_1$) acquired in Step 1 might cover the full color gamut of the image forming apparatus 1. In this case, there is no need to perform the processing in Step 2 described above. The first-relationship generation section 944 may thus be provided with a judgment section that judges the necessity of the processing in Step 2, and whether to perform the processing in Step 2 may be judged in accordance with a result of the judgment performed by the judgment section. To judge this, for example, the color gamut of the image forming apparatus 1 is divided into regions, and frequency distribution indicating how many pieces of data in FIG. 10B are included in each region is calculated. A judgment is made on the basis of whether a region exhibiting low frequency is present.

The first relationship candidates illustrated in FIG. 10A are desirably close to the first relationships acquired in Step 1 in FIG. 10B. A large discrepancy therebetween causes deterioration of color reproduction accuracy or continuity near a boundary between the relationships even though the aforementioned matching is performed.

Hence, multiple first relationship candidates may be prepared in advance for each first relationship acquired in Step 1, and one of the candidates may be selected as the first relationship candidate for the first relationship. In other words, one of the first relationship candidates that is closest to the first relationship acquired in Step 1 is selected. In this case, the first-relationship generation section 944 may be provided with, for example, a setting section that selects one of the first relationship candidates and sets the first relationship candidate.

For example, if it is known that the image G1 has been output under the condition close to Japan Color 2011, a first relationship candidate using the Japan Color 2011 condition may be included in the multiple first relationship candidates. A first relationship candidate using a standard and frequently used condition may also be included. A first relationship candidate having a typical condition used for image forming apparatuses sold in the past may also be included. A larger number of first relationship candidates may also be automatically generated.

Correction Image

A correction image output by the image recording device 200 of the image forming apparatus 2 will be described on the basis of correction image data generated by the correction-image-data generation section 948.

Figure 11:
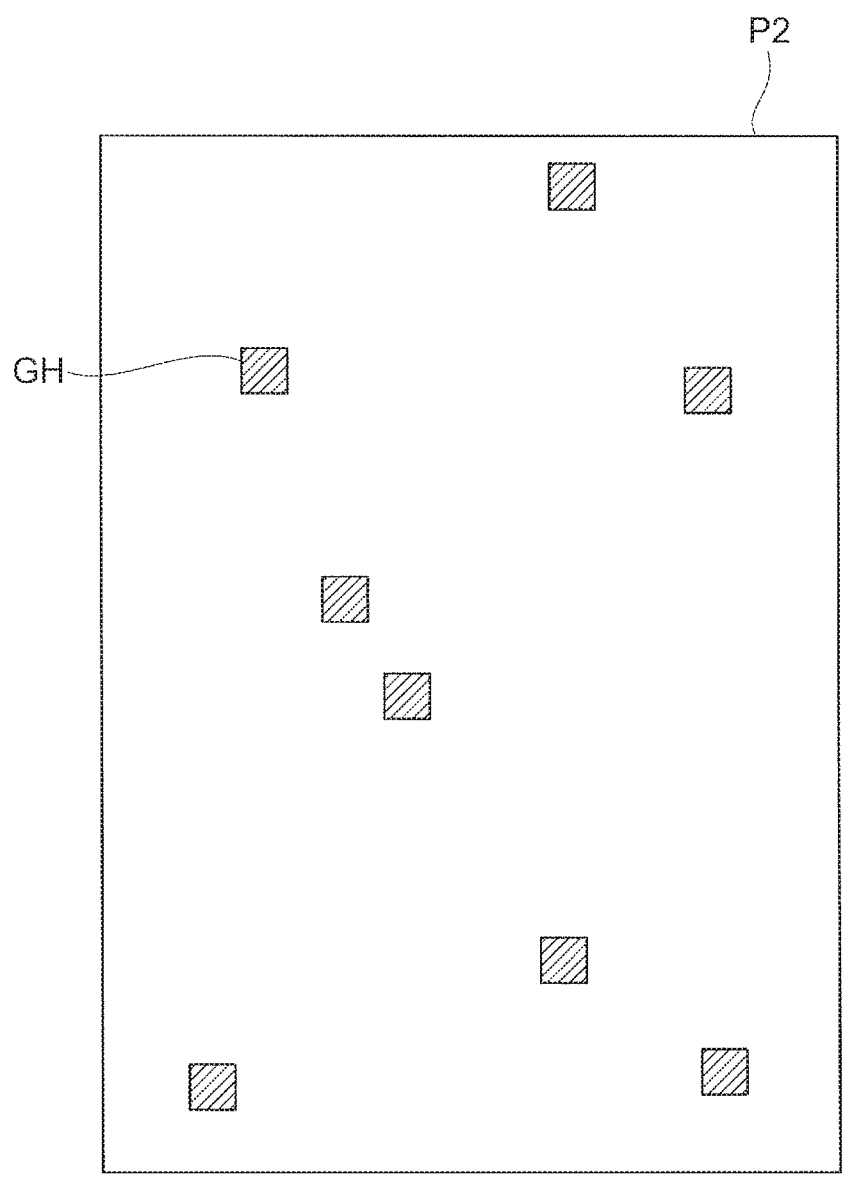
FIG. 11 is a diagram for explaining a correction image.

FIG. 11 is a diagram for explaining a correction image.

Correction images GH are color patches as described above and are each formed into a rectangle, for example, as illustrated in FIG. 11.

In the exemplary embodiment, the correction-image-data generation section 948 generates correction image data on the basis of unadjusted image data generated by the rasterizing section 92 and does not use unadjusted image data included in the first relationship candidates described above. In other words, the unadjusted image data included in the first relationship candidates is used to cover the full color gamut of the image forming apparatus 1 and does not directly represent the color reproducibility of the image recording device 200 of the image forming apparatus 1. In contrast, the unadjusted image data generated by the rasterizing section 92 directly represents the color reproducibility of the image recording device 200 of the image forming apparatus 1, and the use of this leads to enhancement of the accuracy of the color adjustment performed by the image recording device 200 of the image forming apparatus 2.

Correction image data for forming each correction image GH is the same as the unadjusted image data of the regions forming the region group extracted by the region-group extraction section 942. The correction-image-data generation section 948 generates the correction image data to arrange each correction image GH in the location of the regions forming the region group extracted by the region-group extraction section 942.

This results in formation of the correction image GH in accordance with the unadjusted image data of the regions forming the region group extracted by the region-group extraction section 942. In addition, the correction image GH is formed in the location of the regions forming the region group extracted by the region-group extraction section 942. Specifically, the location of each correction image GH illustrated in FIG. 11 corresponds to the location of the corresponding regions forming the region group extracted by the region-group extraction section 942. This enables the color adjustment to be performed to address a color difference caused by variations in color observed on one plane.

Although the correction images GH are of the same size in the example in FIG. 11, the sizes of the respective correction images GH are not limited to the same size. The correction images GH may be of different sizes. For example, the size of each correction image GH may be changed in accordance with the size of the regions forming the region group extracted by the region-group extraction section 942. In other words, the larger the extracted regions, the larger the corresponding correction image GH. The smaller the extracted regions, the smaller the corresponding correction image GH. Note that the shape of each correction image GH may be changed in accordance with the shape of the regions.

Color Adjustment Performed by Image Forming Apparatus 2

Subsequently, how the image forming apparatus 2 performs color adjustment for outputting an image G2 having colors adjusted to match those of the image forming apparatus 1 will be described.

Figure 12:
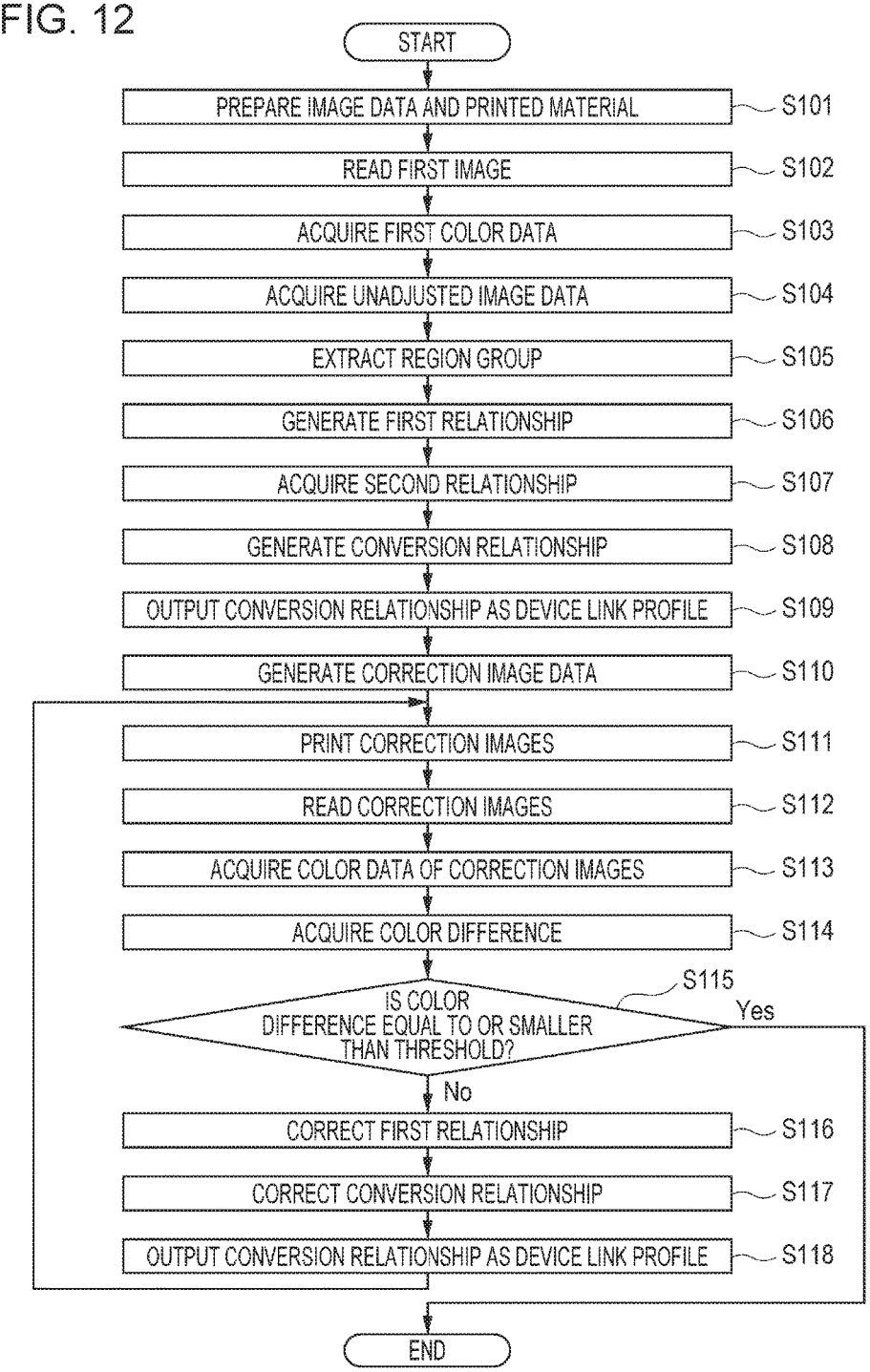
FIG. 12 is a flowchart for explaining how the image forming apparatus performs color adjustment for outputting an image having colors adjusted to match colors of another image forming apparatus.

FIG. 12 is a flowchart for explaining how the image forming apparatus 2 performs the color adjustment for outputting the image G2 having colors adjusted to match colors of the image forming apparatus 1.

Hereinafter, description is given by using FIGS. 5 and 12.

First, a printed material on which an image G1 output by the image forming apparatus 1 is printed and image data used for printing the printed material are prepared (step S101).

The image reading device 100 of the image forming apparatus 2 subsequently reads the image G1 (first image) (step S102).

The color data (first color data) of the image G1 read by the image reading device 100 is transmitted to the color processing section 94 of the controller 900, and the color-data acquisition section 943 of the color processing section 94 acquires the color data (first color data) (step S103).

In contrast, the image data of the image G1 formed by the image forming apparatus 1 is processed by the rasterizing section 92. The unadjusted-image-data acquisition section 941 then acquires unadjusted image data from the rasterizing section 92 (step S104).

The region-group extraction section 942 extracts specific regions in the image as a region group on the basis of the acquired unadjusted image data (step S105). To extract the region group, for example, the method described with reference to FIGS. 6A to 6C is used.

The first-relationship generation section 944 generates a first relationship that is a relationship between the unadjusted image data and the color data (first color data) acquired by the color-data acquisition section 943 (step S106). To generate the first relationship, for example, one of the methods described with reference to FIGS. 7 to 10D is used.

The second-relationship acquisition section 945 acquires a second relationship stored in the second-relationship memory 946 (step S107).

The conversion-relationship generation section 947 generates, on the basis of the first and second relationships, a conversion relationship for the image recording device 200 of the image forming apparatus 2 to perform the color adjustment (step S108).

The conversion-relationship generation section 947 outputs the conversion relationship as a device link profile to the color adjustment section 93 (step S109).

The correction-image-data generation section 948 generates, on the basis of the unadjusted image data, correction image data for correcting the conversion relationship (step S110).

The correction-image-data generation section 948 outputs the correction image data, and the image recording device 200 of the image forming apparatus 2 prints correction images GH as illustrated in FIG. 11 on a paper sheet P2 (step S111).

The image reading device 100 of the image forming apparatus 2 subsequently reads each correction image GH (step S112).

Color data of the correction image GH read by the image reading device 100 is transmitted to the color processing section 94 of the controller 900, and the color-data acquisition section 943 of the controller 900 acquires color data of the correction image GH (step S113).

The correction determination section 949 acquires a color difference between the color data (first color data) of the image G1 (first image) and the corresponding color data of the correction image GH (step S114).

The correction determination section 949 determines whether the color difference is equal to or smaller than the predetermined threshold (step S115).

If the color difference is equal to or smaller than the predetermined threshold as a result of the determination (Yes in step S115), the series of steps is terminated.

If the color difference is larger than the predetermined threshold (No in step S115), the first-relationship correction section 950 corrects the first relationship (step S116).

The conversion-relationship correction section 951 further corrects the conversion relationship in accordance with the corrected first relationship (step S117).

The conversion-relationship correction section 951 outputs the conversion relationship as a device link profile to the color adjustment section 93 (step S118). The processing thereafter returns to step S111.

The color adjustment section 93 performs conversion of the unadjusted image data by using the device link profile so as to adjust the colors of the image G2 to match the colors of the image G1. The colors of the image G2 to be output by the image forming apparatus 2 thereby match the colors of the image G1 output by the image forming apparatus 1.

The image reading device 100 is incorporated in the image forming apparatus 2 in the example described above in detail but may be separately provided as an independent apparatus.

Likewise, the controller 900 is incorporated in the image forming apparatus 2, but the function of the color processing section 94 of the controller 900 may be independently provided. Operations of the function may be performed by, for example, a PC, a tablet terminal, a smartphone, or another apparatus. In this case, the function of the color processing section 94 may be implemented by software (a program) run on such an apparatus.

Further, the image forming apparatuses 1 and 2 basically having the same configuration have been described above in detail by taking, as an example, an apparatus that forms an image by using an electrophotographic system. However, the configuration is not limited to that of the apparatus. An apparatus capable of forming an image on a medium (recording medium) by using an inkjet system or an offset printing system other than the electrophotographic system and outputting the medium may be used.

In the example described above in detail, the unadjusted image data to undergo the color adjustment is data acquired after the rasterizing section 92 rasterizes image data acquired by the data acquisition section 91 but is not limited to the data resulting from the rasterization. The unadjusted image data may be data resulting from another type of image processing. Note that some apparatuses have the same unadjusted image data as the image data.

The exemplary embodiment has heretofore been described. The technical scope of the invention is not limited to the scope of the exemplary embodiment. From the description of the scope of claims, it is apparent that the technical scope of the invention includes various modifications and improvements made to the exemplary embodiment.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A color processing device comprising:
   a color-data acquisition section that acquires color data of a first image output by a first image forming device on a basis of image data;
   a conversion-relationship generation section that generates a conversion relationship used for performing color adjustment, the conversion relationship being generated in accordance with a first relationship that is a relationship between unadjusted image data to undergo the color adjustment and the color data of the first image and a second relationship regarding a second image forming device, the color adjustment being performed to match a color of a second image to be output by the second image forming device on a basis of the unadjusted image data with a color of the first image;
   a correction-image-data generation section that generates, on a basis of the unadjusted image data, correction image data for correcting the conversion relationship; and
   a conversion-relationship correction section that performs correction of the conversion relationship on a basis of color data of correction images output by the second image forming device by using the correction image data.

2. The color processing device according to claim 1, wherein the correction image data is data of the correction images in which a plurality of color patches having a highly uniform color are respectively arranged.

3. The color processing device according to claim 1, wherein the first relationship is generated by applying the unadjusted image data and the acquired color data of the first image to a first relationship candidate prepared in advance and by performing matching on the unadjusted image data and the color data with the first relationship candidate.

4. The color processing device according to claim 1, further comprising:
   a region-group extraction section that extracts regions in an image as a region group on a basis of the image data,
   wherein the first relationship is generated on a basis of color data of the regions of the first image, the color data being acquired from the region group.

5. The color processing device according to claim 4, wherein the correction-image-data generation section generates the correction image data to arrange each correction image in a location of the regions forming the region group extracted by the region-group extraction section.

6. The color processing device according to claim 1, wherein the conversion-relationship correction section repeats the correction of the conversion relationship until a color difference between the color data of the first image and corresponding color data of each correction image satisfies a predetermined condition.

7. An image forming apparatus comprising:
   a second image forming device that forms an image on a recording medium on a basis of image data, the second image forming device being different from a first image forming device that forms an image on a recording medium on a basis of the image data;

a color adjustment device that performs color adjustment on the image to be formed by the second image forming device; and
a conversion-relationship generation device that generates a conversion relationship that is used by the color adjustment device to perform the color adjustment,
the conversion-relationship generation device including
a color-data acquisition section that acquires color data of a first image output by the first image forming device on the basis of the image data,
a conversion-relationship generation section that generates the conversion relationship used for performing the color adjustment, the conversion relationship being generated in accordance with a first relationship that is a relationship between unadjusted image data to undergo the color adjustment and the color data of the first image and a second relationship regarding the second image forming device, the color adjustment being performed to match a color of a second image to be output by the second image forming device on a basis of the unadjusted image data with a color of the first image,
a correction-image-data generation section that generates, on a basis of the unadjusted image data, correction image data for correcting the conversion relationship, and
a conversion-relationship correction section that performs correction of the conversion relationship on a basis of color data of a correction image output by the second image forming device by using the correction image data.

8. An image forming system comprising:
a first image forming device that forms an image on a recording medium on a basis of image data;
a second image forming device that forms an image on a recording medium on a basis of the image data;
a color adjustment device that performs color adjustment on the image to be formed by the second image forming device; and
a conversion-relationship generation device that generates a conversion relationship that is used by the color adjustment device to perform the color adjustment,
the conversion-relationship generation device including
a color-data acquisition section that acquires color data of a first image output by the first image forming device on the basis of the image data,
a conversion-relationship generation section that generates the conversion relationship used for performing the color adjustment, the conversion relationship being generated in accordance with a first relationship that is a relationship between unadjusted image data to undergo the color adjustment and the color data of the first image and a second relationship regarding the second image forming device, the color adjustment being performed to match a color of a second image to be output by the second image forming device on a basis of the unadjusted image data with a color of the first image,
a correction-image-data generation section that generates, on a basis of the unadjusted image data, correction image data for correcting the conversion relationship, and
a conversion-relationship correction section that performs correction of the conversion relationship on a basis of color data of a correction image output by the second image forming device by using the correction image data.

* * * * *